Dec. 22, 1936. F. B. YINGLING Re. 20,216

COAL MINING MACHINE

Original Filed July 14, 1933 6 Sheets-Sheet 1

INVENTOR
FRANK B. YINGLING.
BY Toulmin & Toulmin
ATTORNEYS

Dec. 22, 1936. F. B. YINGLING Re. 20,216
COAL MINING MACHINE
Original Filed July 14, 1933 6 Sheets-Sheet 2
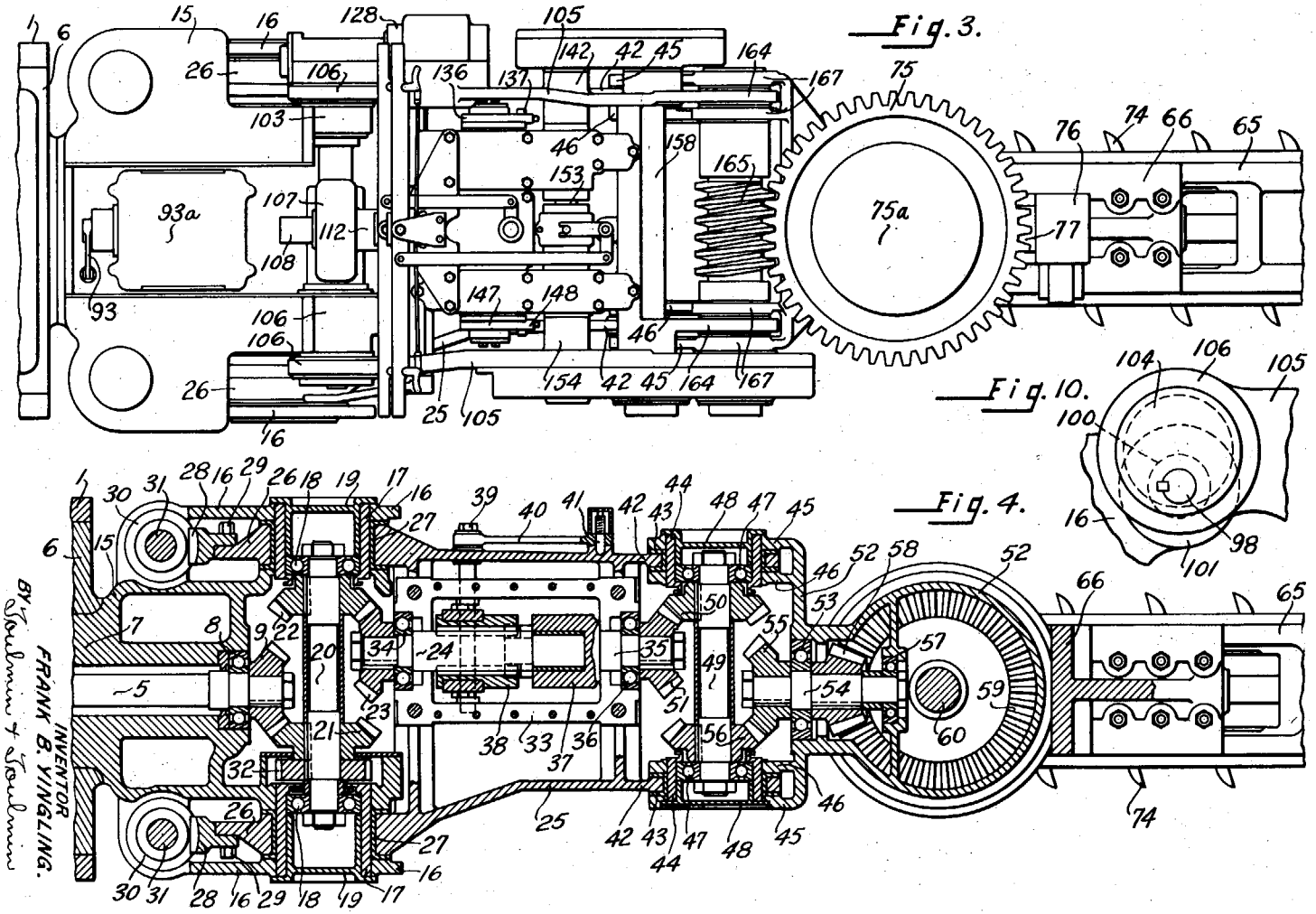
INVENTOR
FRANK B. YINGLING.
BY Toulmin & Toulmin
ATTORNEYS Dec. 22, 1936. F. B. YINGLING Re. 20,216

COAL MINING MACHINE

Original Filed July 14, 1933 6 Sheets-Sheet 3

INVENTOR
FRANK B. YINGLING.
Toulmin & Toulmin
ATTORNEYS

Dec. 22, 1936. F. B. YINGLING Re. 20,216
COAL MINING MACHINE
Original Filed July 14, 1933 6 Sheets-Sheet 4
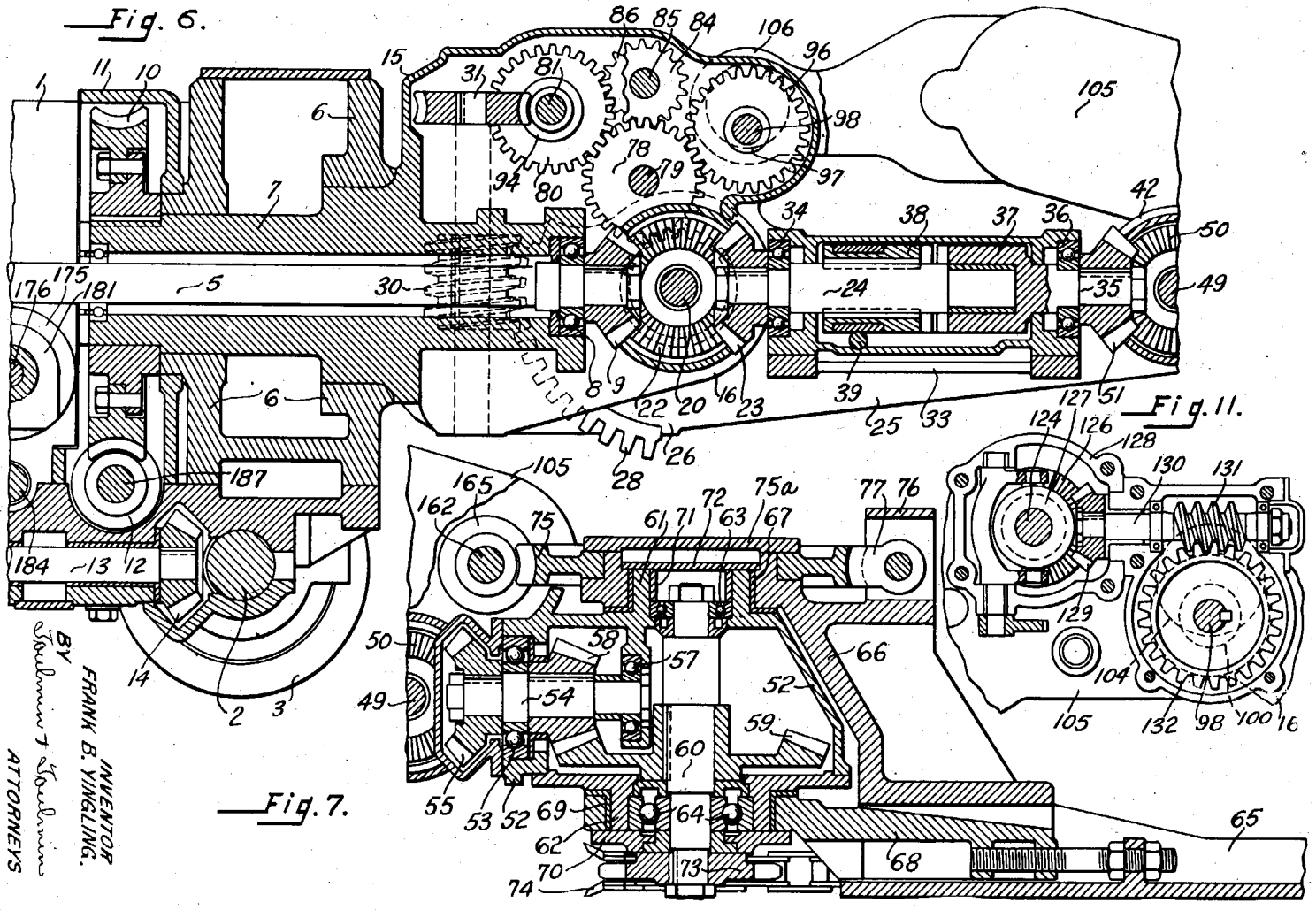
INVENTOR
FRANK B. YINGLING.
BY
Toulmin & Toulmin
ATTORNEYS Dec. 22, 1936. F. B. YINGLING Re. 20,216

COAL MINING MACHINE

Original Filed July 14, 1933 6 Sheets-Sheet 5

INVENTOR
FRANK B. YINGLING.
BY Toulmin & Toulmin
ATTORNEYS

Dec. 22, 1936. F. B. YINGLING Re. 20,216
COAL MINING MACHINE
Original Filed July 14, 1933 6 Sheets-Sheet 6
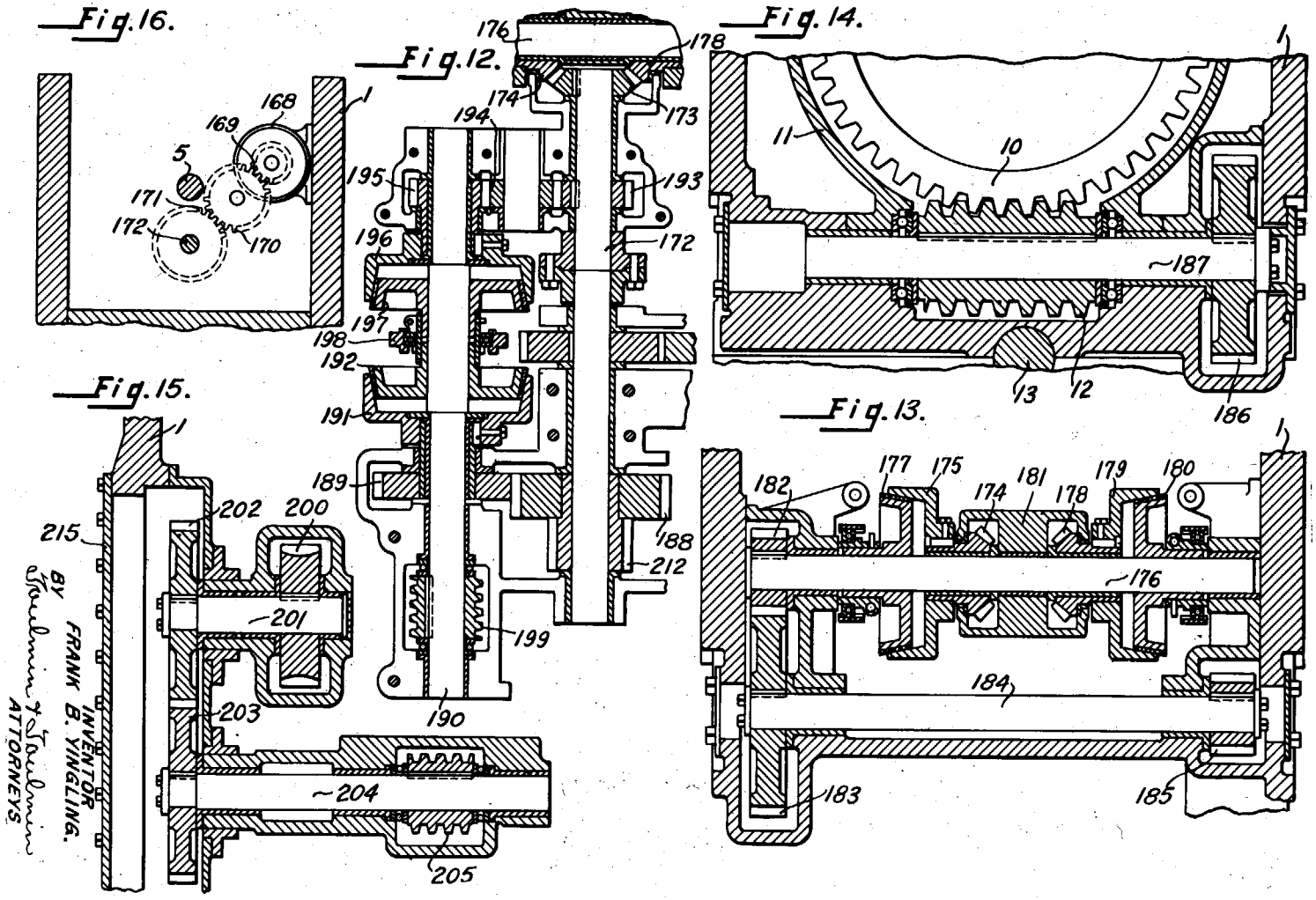

Reissued Dec. 22, 1936

Re. 20,216

UNITED STATES PATENT OFFICE 20,216

COAL MINING MACHINE

Frank B. Yingling, Hamilton, Ohio, assignor to Cyrus J. Fitton, Hamilton, Ohio

Original No. 1,996,135, dated April 2, 1935, Serial No. 680,375, July 14, 1933. Application for reissue October 7, 1936, Serial No. 105,353

27 Claims. (Cl. 262—28)

This invention relates to coal mining machines, and has for its object to provide, in connection with a link carrying a cutting mechanism, means independent of the link for tilting the cutting mechanism on the link.

It is an object of this invention to provide, in connection with a link supporting a cutting mechanism, means to swing the cutting mechanism laterally on the link but independently of the link.

It is also an object of this invention to provide, in connection with a mining machine, means for supporting one end of a link which has on its other end a cutting mechanism, said means comprising elements adapted to connect the shaft-sections from which the cutting mechanism is operated.

It is also an object of this invention to provide, in connection with a rotatably mounted casing, means for pivotally supporting one end of a link, which has on its other end cutting mechanism, and means supported by the casing for rotating the cutting mechanism with relation to the link, said last named means being out of parallelism with the link.

It is a further object of this invention to provide, in connection with a mining machine a rotatably mounted casing, a shaft in the casing supporting one end of a link which has on its other end cutting mechanism, means operated by the shaft through said link for operating the cutting mechanism, a second link adjustably connected at one end to the casing and pivoted at its other end to the cutting mechanism, means operatively connected to the shaft for adjusting said second link, and means connected to the shaft and extending through the second link for swinging the cutting mechanism in any desired plane within the limits of the machine, for elevating the first named link on the shaft and for elevating the cutting mechanism on the first named link.

A particular object of my invention is to provide non-parallel links, the pivotal centers of which are connected by lines always out of parallelism. By eccentrically adjusting the pivotal support of one of said links it is possible to very accurately position the angularity of the kerf cutter irrespective of the position of the links, and by having the links out of parallelism between their pivotal centers it is possible to thereby quickly determine the displacement of the kerf cutter from the desired plane and correct the error, whereas with parallel links there may be material divergences from the desired plane without the ability of correcting them. It is my object to avoid such parallelism, and bring about this improved adjustment in kerf cutting control, by the use of linkage in the shape of a trapezium, i. e. a four-sided figure of which no two sides are parallel.

When properly adjusted, the articulated supporting head, the cutting mechanism, and the intermediate adjustable linkage form a rigid unit, and this intermediate linkage, which is adjusted as by means of an eccentric, is pivotally supported on and operated through four transversely extending axes or shafts of the machine, which axes are disposed at the four corners of a trapezium.

These and other advantages will appear from the following description taken in connection with the drawings.

Referring to the drawings:

Figure 3 is a top plan view of the machine.

Figure 4 is a horizontal section showing the mechanism for operating the cutter.

Figure 6 is a vertical longitudinal section through the front end of the truck and the part of the mining machine adjacent thereto, with the auxiliary link shown in side elevation.

Figure 7 is a vertical longitudinal section through the cutter head.

Figure 10 is a fragmentary view showing the eccentric connection between one end of the supporting link and the supporting head.

Figure 11 is a fragmentary view partly in section, showing the gears for rotating the supplementary link eccentrics.

Figures 1, 2:
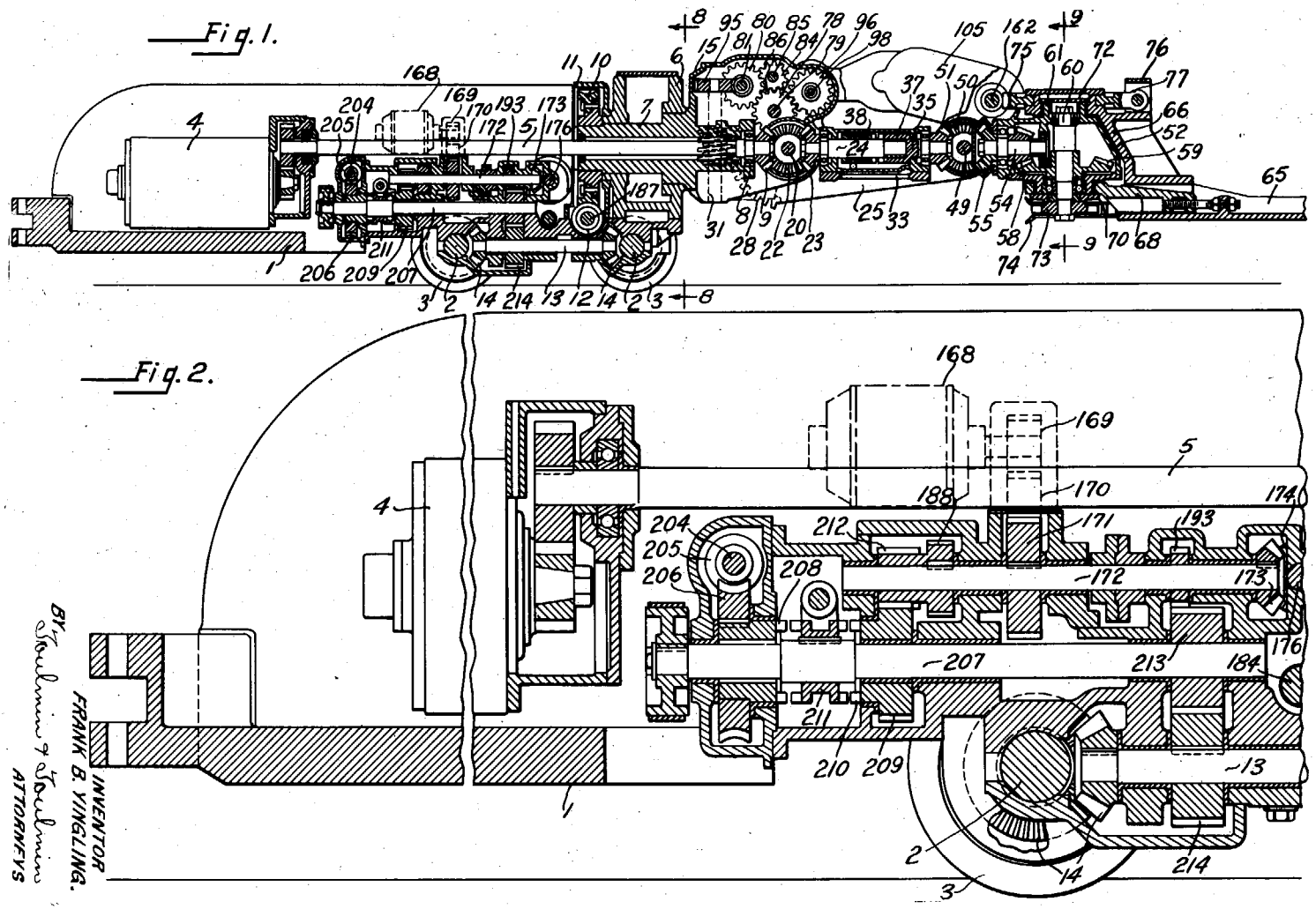
Figure 1 is a vertical longitudinal section through the mining machine.
Figure 2 is an enlarged view on a line similar to that of Figure 1, showing the rear end of the truck.
Figure 5:
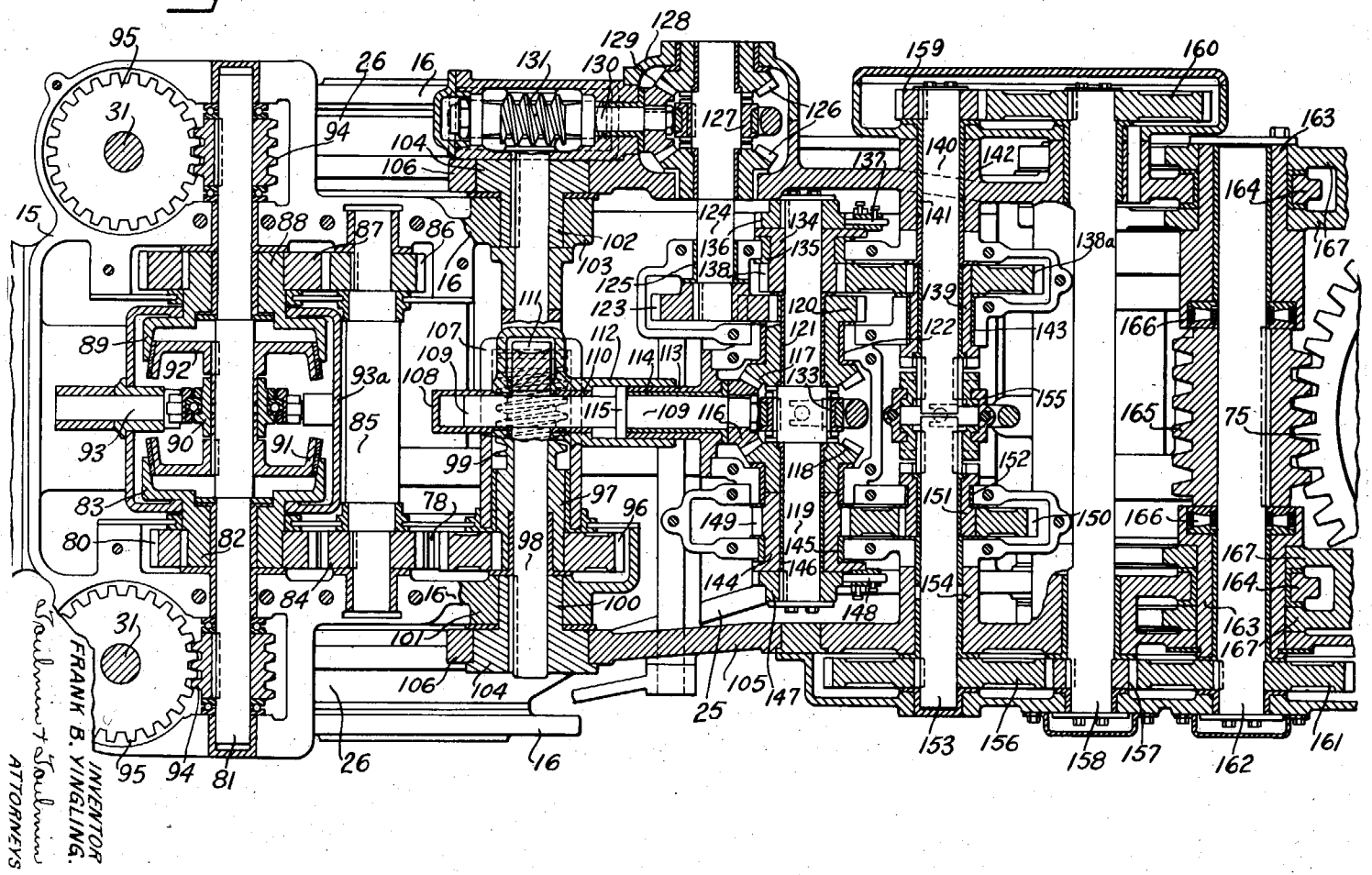
Figure 5 is a horizontal section through the auxiliary link, showing the mechanism for elevating the cutter blade supporting link of the machine, for swinging the cutter blade laterally, and for elevating the cutter blade with respect to the cutter blade supporting link.
Figure 8:
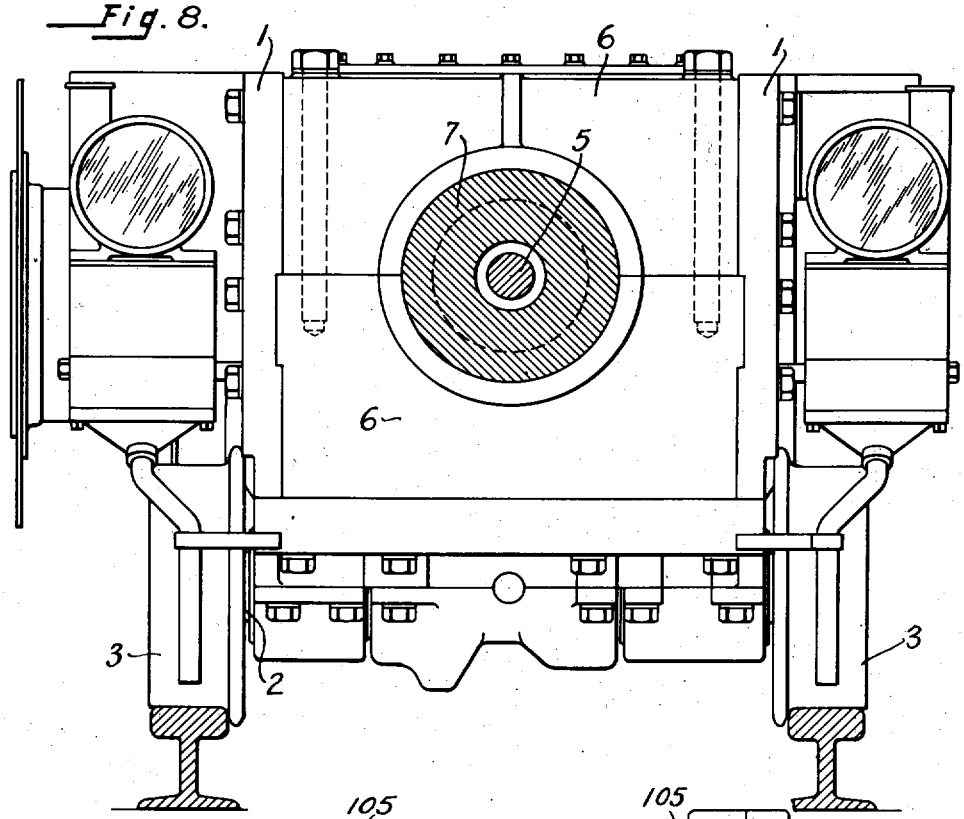
Figure 8 is a section on line 8—8 of Figure 1.
Figure 9:
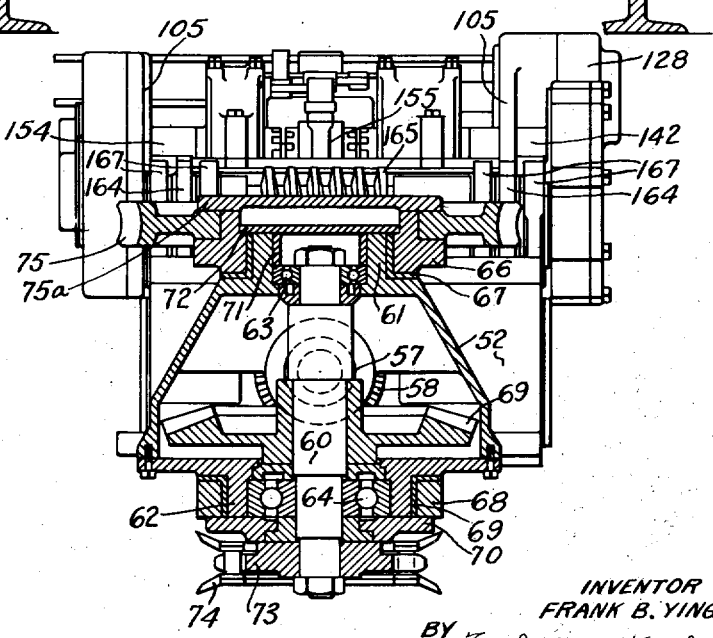
Figure 9 is a section on line 9—9 of Figure 1.

Figures 12 to 15, inclusive, show the mechanism by which power is transmitted from a motor to the rotating head, and from the same motor to the wheels of the truck for transporting the truck.

Figure 16 is a section through the truck, showing the motor and the shaft from which the truck is driven and the head is rotated.

The transporting part of the mining machine comprises a truck body or frame 1, supported on axles 2 having wheels 3 adapted to travel upon some suitable trackway. On the rear end of the frame is a motor 4 adapted to operate a shaft 5 connected at its rear end to the motor and supported at its other end in bearings 8 located in a supporting head 7, rotatably mounted in a stationary head 6 on the front end of the frame 1.

On the forward end of the shaft 5 is a gear 9, while on the rear end of the supporting head 7 is a worm gear 10, partly enclosed by means of a housing or casing 11, and engaging a worm 12 by which it is operated. The wheels and axles are rotated by means of shafts 13 operatively connected to the axles by means of gears 14. On the front end of the supporting head 7, which is in front of the stationary head, is a casing 15, which has on opposite sides forwardly extending arms 16. There are two of these arms, each of which is provided with a hole for receiving a sleeve 17.

These sleeves are in alinement and each has in its inner end bearing members 18, which rotatably support one end of a shaft 20. The outer ends of these sleeves are closed by means of caps 19. These caps fit within the sleeves and engage the bearing members and form with the bearing members and the ends of the shaft lubricant chambers. Adjacent one end of the shaft 20 is a gear 21, which engages the gear 9 so that the shaft 20 rotates upon the rotation of the shaft 5. Adjacent the other end of the shaft 20 is a second gear 22, which meshes with a gear 23 located on one end of a longitudinally extending shaft 24 supported by suitable bearing in a link 25.

This link has at one end a pair of arms 26. Each arm is provided with a hole having a bushing 27 therein. Each bushing fits over one of the sleeves 17 so that one end of the link is supported by means of the two sleeves 17. The arm end of this link fits between parts of the arm 16 on the casing 15.

On the arms 26 are gear segments 28 attached thereto by means of bolts or screws 29. There are two of these segments, each one engaging a worm 30 located on a vertically disposed shaft 31, supported by suitable bearings in the casing 15. On the upper end of each shaft 31 is a gear 95, later to be described. On the shaft 20 between the gear 21 and one of the sleeves 17, is a gear 32. The purpose and operation of this gear will be described later.

The shaft 24 is supported in a casing 33 by means of bearing members 34 located in one end of the casing. This casing is supported in some suitable manner in the interior of the link 25. The shaft 24 forms an integral part of another shaft 35 supported in bearings 36 in the casing 33. These two shafts are connected by means of clutch mechanism consisting of an element 37 rigidly attached to the shaft 35, and a movable clutch element 38 slidably mounted on the shaft 24 and adapted to engage or disengage the element 37.

The clutch element 38 is moved longitudinally on the shaft 24 by means of some suitable connection between the element and the shaft 39 supported on the link 25 of the casing 33. This shaft is operated by means of a lever 40, which has on one end a plunger 41 for holding it in adjusted positions. This plunger engages some suitable hole or socket in one side of the link 25. On the forward end of the link 25 is a pair of forwardly extending arms 42, each of which is provided with an opening in which there is located a bushing 43. Within each bushing is a sleeve 44. These sleeves are in alinement and each has in its inner end bearing members 47.

The sleeves 44 serve to pivotally support the cutter head 52, which has extending rearwardly therefrom two pairs of arms 45 and 46. These arms are provided with holes to receive the sleeves 44. This connection between the cutter head and the link 25 is illustrated in Figure 4. The bearings serve to rotatably support the ends of a shaft 49. Each sleeve 44 has on its outer end a cap 48, which serves to form, in connection with the bearings and the ends of the shaft 49, lubricant chambers.

The shaft 49 is rotated by means of a gear 50 mounted upon one end thereof and engaging a gear 51 mounted on the forward end of the shaft 35. The cutter head 52, which is at the front of the arms 45 and 46, is somewhat circular in shape and has therein bearings 53, which support one end of a shaft 54. The end of the shaft to the rear of the bearing member 53 has thereon a gear 55 which meshes with a gear 56 on the end of the shaft 49 remote from the gear 50.

The cutter head in advance of the bearing 53 is provided with a bearing 57, which rotatably supports the front end of the shaft 54. Adjacent the bearing 57 the shaft 54 is provided with a gear 58 which meshes with a gear 59 located on a vertical shaft 60. On the upper end of the cutter head there is provided an upwardly extending annular projection 61, while on the lower part of the cutter head there is provided a downwardly extending annular projection 62. Within the upper projection 61 are bearings 63 which serve to rotatably support the upper end of the shaft 60. Within the lower annular projection 62 are bearing members 64, which rotatably support the lower end of the shaft 60.

The numeral 65 indicates a cutter bar, which has an upper arm 66 having a hole therein, with a bushing 67 fitting about the upper annular projection 61, and a lower arm 68, which fits around the lower annular projection 62. By means of these projections and arms the cutter bar is rotatably supported on the cutter head. Fitting about the lower end of the shaft 60 and against the annular projection 62 and the bearing members 64 is a disc 70.

Fitting within the annular projection 61 and against the upper bearing 63 is a sleeve 71. This sleeve, together with a plate 72, forms a lubricant chamber about the upper end of the shaft 60. On the lower end of the shaft 60 is a sprocket wheel 73 used for driving a cutter chain 74. Located on the upper arm 66 is a worm gear 75, which is held thereon by means of a clamp plate 75*a*. Located on the upper arm, in front of the worm gear 75, is a bracket 76, which has pivoted thereto a dog 77 adapted to engage the teeth of the worm gear to prevent its rotation with relation to the cutter head.

The foregoing structure serves to operate the cutter chain by means of mechanism extending from the shaft 20 to the shaft 60. The gear 32 on the shaft 20 meshes with a gear 78 located on a transversely disposed shaft 79, supported in suitable bearings in the casing 15. This gear 78 meshes with a gear 80 mounted on the shaft 81 also supported in suitable bearings in the casing 15. The gear 80 is rotatably mounted on the shaft 81 by means of a sleeve 82, which has on its inner end a clutch element 83. The gear 80 and the sleeve 82 rotate together.

Also meshing with the gear 78 is a second gear 84 mounted on a shaft 85 supported in suitable bearings in the casing 15. On this shaft 85 is a second gear 86, which meshes with a gear 87 mounted upon a sleeve 88 loosely mounted on the shaft 81. This sleeve has on its inner end a clutch element 89.

Between the clutch elements 83 and 89 and mounted on the shaft 81 is a sleeve 90, which has on one end a clutch element 91 adapted to engage the clutch element 83, and on its other end a clutch element 92 adapted to engage the clutch element 89. The clutch elements are enclosed within a casing 93a which supports suitable clutch shifting means 93. Adjacent each end of the shaft 81 is a worm 94 engaging the worm gear 95, located on the upper end of the shaft 31.

The shaft 81 is rotated in one direction through the following chain of gears: gear 32 located on the shaft 20; gear 78; gear 80 located on the sleeve 82. This sleeve is caused to rotate with the shaft through the clutch element 91 engaging the clutch element 83.

In order to rotate the shaft 81 in reverse direction it is operated through the following chain of gears, starting with the gear 32 mounted on the shaft 20. This gear drives the gear 78; gear 84 on shaft 85; gear 86 on the shaft 85 meshing with the gear 87 on the sleeve 88 and the clutch element 92 engaging the clutch element 89. By means of these chains of operation the link 35 is caused to swing on the sleeves 17 through the operation of the worms 30 on the gear segments 28.

The gear 78 also engages a gear 96 integral with a sleeve 97 rotatably mounted on the shaft 98. The sleeve 97 has thereon a worm 99. On one end of the shaft 28 and attached thereon by means of a spline is a bushing 100, which is rotatably mounted in a bearing 101 formed in one of the arms 16 extending forwardly from the casing 15. On the other end of the shaft and splined thereto is a bushing 102 rotatably supported in a bearing 103 formed in the other one of the forwardly extending arms 16 of the casing 15.

On the outer end of each of the bushings 100 and 102 is an eccentric 104. These eccentrics serve as adjustable supports for the rear end of a link 105, which has extending rearwardly therefrom arms 106, each of which is provided with a circular opening to receive one of these eccentrics. Suitably supported by some part of one of the arms 16 is a casing 107, which encloses the worm 99 and the worm gear 111 slidably mounted on one end of a shaft 109.

This casing 107 is provided with a circular extension 108 for housing one end of the shaft 109, supported in bearings in the casing and in some suitable part of the frame structure of the link 105. The shaft 109 is surrounded by a bushing 110 located adjacent the worm gear 111. Extending from the casing in a forwardly direction and surrounding the shaft 109 and the bushing 110 is a sleeve 112 which has slidably mounted therein a sleeve 113 supported at one end on the link 105. These two sleeves substantially enclose the shaft 109.

Within the sleeve 113 and around the shaft 109 is a bushing 114. The bushing 114 and the sleeve 113, together with the bushing 110, provide a space around the shaft 109 in which a shoulder 115 on the shaft 109 may oscillate with the shaft. The mechanism just described provides for a longitudinal movement of the casing 107 on the shaft 109, due to the action of the eccentrics on the link 105.

On the forward end of the shaft 109 is a gear 116 which meshes with gears 117 and 118 loosely mounted on a shaft 119. Integral with the gear 117 is a gear 120. Between the gears 117 and 120 and the shaft 119 is a bushing 121, while supporting these two gears in suitable bearings in part of the link structure is a bushing 122. The gear 120 meshes with a gear 123 located on one end of a shaft 124 supported in bearings 125 formed in some suitable part of the link 105.

On the other end of this shaft 124 are two gear members 126 adapted to be engaged by a clutch 127 slidably mounted on the shaft 124 therebetween. These gears are rotatably mounted on the shaft 124 and are selectively caused to rotate therewith by means of this clutch 127. These two gears 126 and the clutch 127 are enclosed in a casing 128. The two gears 126 mesh with a gear 129 on one end of a shaft 130, which has adjacent its other end a worm 131 in mesh with a worm gear 132 located on one end of the shaft 98.

Between the gears 117 and 118 and on the shaft 119 is a clutch 133 slidably mounted on the shaft for causing the gears to rotate selectively with the shaft. On one end of the shaft 119 is a sleeve 134 supported in a bushing 135 mounted in some suitable part of the link 105. On the extreme end of this shaft, beyond the sleeve 134 is a latch disc 136 adapted to be adjustably connected to the sleeve by means of lock members 137 mounted on the sleeve and adapted to engage the teeth of the disc.

The sleeve 134 has thereon gear teeth 138 adapted to engage a gear 138a attached to a sleeve 139 rotatably mounted on a shaft 140. On one end of the shaft 140 is a bushing 141 supported in bearings 142 on the link 105. There is also provided in this link structure a bearing 143 for the sleeve 139. On the other end of the shaft 119 from the gear teeth 138 is a sleeve 144 which is supported in a bushing 145 provided in a suitable bearing in the link 105. Between the shaft 119 and the sleeve 144 is a bushing 146. This end of the shaft 119 is also provided with a toothed disk 147, engaged by an adjusting means 148 located on the sleeve 144.

The sleeve 144 is provided with teeth 149 which engage a gear 150 mounted upon a sleeve 151 supported in bearings 152 in the link 105. This sleeve is rotatably mounted upon a shaft 153, which is in line with the shaft 140 and is supported by means of bearings 154 in the link 105. Surrounding the adjacent ends of the shaft 140 and the shaft 153 is a clutch mechanism 155. This clutch mechanism is composed of two parts adapted to rotate independently, but which are moved together longitudinally on the shaft. One part of this clutch mechanism will engage a corresponding clutch mechanism on the sleeve 139, while the other part of this clutch mechanism will engage a clutch member on one end of the sleeve 151. These two shafts may be caused to rotate selectively but are never rotatively driven at the same time.

On the outer end of the shaft 153 is a gear 156 which meshes with a pinion 157 located on one end of a shaft 158. On the outer end of the shaft 140 is a pinion 159 which meshes with a gear 160 on the end of the shaft 158 opposite the pinion 157. The pinion 157 also engages and operates a gear 161 located on one end of a shaft 162. On each end of the shaft 162 is a sleeve 163 mounted in bearings provided therefor in arms 164, provided on the forward end of the link 105. Between the two sleeves 163 is a worm 165 splined on the shaft 162. Between this worm and each sleeve is a thrust bearing 166.

Extending rearwardly from the cutter head is a plurality of arms 167, which are provided with holes therein to receive the sleeve 163. These arms interconnect with the forwardly extending arms of the link 105 so they cannot move longitudinally of the shaft with respect to the link 105, but may freely rotate on the shaft. The worm 165 engages the worm gear 75 for swinging the cutter head about the shaft 60.

The power is transmitted from the motor 4, through the shaft 5 to the shaft 20, which serves to communicate power to two lines of power-transmission, one through the main link 25 for operating the cutter, located on the cutter bar, and the other through an auxiliary or supplementary link 105, for adjusting the auxiliary link 105, and for shifting the cutter bar laterally on its pivot on the cutter head.

For the purpose of controlling the application of power to the various parts the supplemental link is provided with clutches, in connection with the gear mechanism, for changing the direction and the points of application of power transmitted from the shaft 20.

From the shaft 20 power is transmitted through shafts 24 and 35 to shaft 49, from which motion is transmitted to the shaft 54 for operating the sprocket wheel to which the cutter is applied. From the shaft 20 power is transmitted through the gear 32 and the shaft 81 for rotating the shafts 31, by which the links are tilted so that the cutter head may be elevated or adjusted.

The cutter head may be rotated on the outer end of the main link, through the eccentric mechanism located on the rear end of the auxiliary or upper link 105, operatively connected with the shaft 20. Through a series of gearing between shaft 20 and the shaft 162 the worm 165 is operated for swinging the cutter bar laterally or in its various positions.

It should be particularly noted that a line drawn between the centers 162 and 98 will not be parallel to a line drawn between the centers 20 and 49. Nor will a line drawn between the centers 98 and 20 be parallel with a line drawn between the centers 162 and 49. These four pivots 20, 49, 98 and 162 form a linkage in the shape of a trapezium, with no two lines between pivot points in parallelism. In other words the links are out of parallelism and are of unequal length between pivots 98—162 and 20—49, the upper link 105 being longer than the lower link 25, as will be seen in Figure 1. Being out of parallelism the necessity is demonstrated to the operator constantly for adjusting the eccentric support of the shaft 98 in order to bring the kerf cutter into the desired plane. This results in constant attention to this factor of operation, with a correspondingly greatly increased accuracy in the location of the kerf in the desired plane, with a resulting increase in the amount of coal mined. The supporting or rotating head 7 is rotated by means of a motor 168 suitably supported on the truck. This same motor is used for propelling the truck along a track. On one end of the motor shaft is a pinion 169, which meshes with an idler pinion 170, engaging a gear 171 mounted upon a shaft 172 rotatably supported in suitable bearings on the truck frame.

On one end of the shaft 172 is a gear 173 meshing with two other gears 174 and 178, rotatably mounted on a shaft 176. Integral with the gear 174 is a clutch member 175 adapted to be engaged by a clutch member 177 slidably mounted upon the shaft 176 but rotatable therewith. On the gear 178 is a clutch member 179 adapted to be engaged by a clutch member 180 slidably mounted on the shaft 176, but rotatable therewith. The clutch elements 177 and 180 are operated simultaneously to be engaged with or disengaged from the clutch elements 175 and 179. By means of these various clutch elements the direction of rotation of the shaft 176 may be controlled. The gears 173, 174, and 178 are enclosed within a housing 181.

On one end of the shaft 176 is a pinion 182 meshing with a gear 183 on one end of a shaft 184, which has on its other end a pinion 185 in engagement with a gear 186 mounted on one end of a shaft 187, which carries the worm 12, which engages the worm gear 10 for rotating the head 7.

Affixed to the shaft 172 and adjacent one end thereof is a gear 188 which meshes with a gear 189 mounted on a shaft 190. Attached to the gear 189 is a clutch element 191, which is adapted to be engaged by a clutch element 192 slidably mounted on the shaft 190 for rotation therewith. On the end of the shaft 172, remote from the gear 188, is a gear 193 which engages an idler pinion 194 in engagement with a pinion 195 mounted also on the shaft 190.

Attached to the pinion 195 is a clutch element 196 adapted to be engaged by a clutch element 197 suitably attached to the clutch element 192 for simultaneous operation therewith, by means of a clutch operating means 198. By the operation of the clutch elements 192 and 197 the direction of rotation of the shaft 190 may be determined. On one end of the shaft 190 is a worm 199 in engagement with a worm gear 200, mounted on a shaft 201. On one end of the shaft 201 is a gear 202 in operative engagement with a gear 203 affixed to one end of a shaft 204. This shaft 204 has thereon a worm 205 which engages a worm gear 206 mounted on a longitudinally extending shaft 207.

The gear 206 has thereon a clutch element 208 adapted to be engaged by a clutch member 211 slidably mounted on the shaft 207. This clutch 211 is adapted to engage a clutch element 210 mounted upon a gear 209, rotatably mounted on the shaft 207. This gear 209 engages a pinion 212, which is integral with the gear 188.

There is also mounted on the shaft 207 a gear 213 which meshes with a gear 214 on the shaft 13. The shaft 13 is the shaft which drives the axles for rotating the wheels that carry the truck. The truck is driven through the shaft 207. This shaft may be rotated through the gear 206 or through the gear 209, depending upon which clutch element is engaged by the clutch 211. If the clutch element 208 is engaged by the clutch 211 the truck is caused to travel through the operation of the shaft 204, the gear mechanism between this shaft, and the shaft 172.

In the event that the clutch 211 is in engagement with the clutch element 210 the truck is propelled by the operation of the shaft 207 directly through the shaft 172. This direction of movement of the truck may be controlled by operation of the clutches 192 and 197. The direction of rotation of the head 7 is controlled by the movements of the clutch elements 175 and 179. The speed with which the truck travels is regulated by means of the clutch 211. The side frame is cut away adjacent the gears 202 and 203 to provide a passageway through which these gears may be changed so that gears of different sizes may be used for varying the speed. A closure 215 is provided for covering the gears 202 and 203.

It will be understood that I desire to comprehend within my invention such modifications as come within the scope of my claims and my invention.

Having thus fully described my invention, what I claim as new and desire to secure by Letters Patent is:—

1. In a mining machine, a casing having a pair of arms, a sleeve in each arm, a link having at one end arms pivotally mounted on the sleeves, bearings in each sleeve, a shaft in the bearings, a cutter mounted on the other end of the link, and an operative connection between the shaft and the cutter.

2. In a mining machine, a casing having a pair of arms, a sleeve in each arm, bearing members in one end of each sleeve, a cap in the other end of each sleeve, a shaft in the bearings, and cutter means pivotally supported on the sleeves and operatively connected to the shaft.

3. In a mining machine, a casing having a pair of arms, a sleeve in each arm, bearing members in each sleeve, a shaft mounted in the bearings, a link having at one end arms pivotally mounted on the sleeves, a cutter head pivoted to the other end of the link, a cutter on the head operatively connected to the shaft, and a second link pivoted at one end to the cutter head and connected at its other end to the arms by eccentrics.

4. In a mining machine, a casing having a pair of arms, a sleeve in each arm, a shaft supported at each end in one of the sleeves, a link pivoted at one end on the sleeves, cutter mechanism supported on the other end of the link and operatively connected to the shaft, a bushing rotatably mounted in each arm, an eccentric on the bushing, a second link pivoted at one end on the eccentrics and pivoted at its other end to the cutter mechanism, and means for rotating the bushings.

5. In a mining machine, a casing having a pair of arms, a sleeve in each arm, a shaft supported at each end in one of the sleeves, a link pivoted at one end on the sleeves, cutter mechanism supported on the other end of the link and operatively connected to the shaft, a bushing rotatably mounted in each arm, an eccentric on the bushing, a second link pivoted at one end on the eccentrics and pivoted at its other end to the cutter mechanism, means for rotating the bushings, and means operatively connected to the shaft for swinging the cutter mechanism.

6. In a mining machine, a casing having a pair of arms, a sleeve in each arm, a shaft supported at each end in one of the sleeves, a link pivoted at one end on the sleeves, cutter mechanism supported on the other end of the link and operatively connected to the shaft, a bushing rotatably mounted in each arm, an eccentric on the bushing, a second link pivoted at one end on the eccentrics and pivoted at its other end to the cutter mechanism, means for rotating the bushings, and means operatively connected to the shaft and supported by the second link for swinging the cutter mechanism.

7. In a mining machine, a casing having a pair of arms, a sleeve in each arm, bearing members in each sleeve, a shaft supported by the bearing members, a link having at one end a pair of arms rotatably mounted upon the sleeves, said link having at its other end a pair of arms, a sleeve in each of said last-named arms, a cutter head having a pair of arms pivotally mounted on the last-named sleeves, bearing members in the last-named sleeves, a shaft supported by the last-named bearing members, an operative connection between the shafts, and a cutter supported by the cutter head and operatively connected to the second-named shaft.

8. In a mining machine, a casing having a pair of arms, a sleeve in each arm, bearing members in each sleeve, a shaft supported by the bearing members, a link having at one end a pair of arms rotatably mounted upon the sleeves, said link having at its other end a pair of arms, a sleeve in each of said last-named arms, a cutter head having a pair of arms pivotally mounted on the last named sleeves, bearing members in the last-named sleeves, a shaft supported by the last-named bearing members, an operative connection between the shafts, a cutter supported by the cutter head and operatively connected to the second-named shaft, and means connecting the casing to the cutter head for rotating the cutter head with relation to the link.

9. In a mining machine, a casing having a pair of arms, a sleeve in each arm, bearing members in each sleeve, a shaft supported by the bearing members, a link having at one end a pair of arms rotatably mounted upon the sleeves, said link having at its other end a pair of arms, a sleeve in each of said last-named arms, a cutter head having a pair of arms pivotally mounted on the last-named sleeves, bearing members in the last-named sleeves, a shaft supported by the last named bearing members, an operative connection between the shafts, a cutter supported by the cutter head and operatively connected to the second-named shaft, and means connecting the casing to the cutter head for rotating the cutter head with relation to the link, said means comprising a link pivoted at one end to the cutter head and adjustably connected at its other end to the casing.

10. In a mining machine, a casing having a pair of arms, a sleeve in each arm, bearing members in each sleeve, a shaft supported by the bearing members, a link having at one end a pair of arms rotatably mounted upon the sleeves, said link having at its other end a pair of arms, a sleeve in each of said last-named arms, a cutter head having a pair of arms pivotally mounted on the last-named sleeves, bearing members in the last-named sleeves, a shaft supported by the last-named bearing members, an operative connection between the shafts, a cutter supported by the cutter head and operatively connected to the second-named shaft, and means connecting the casing to the cutter head for rotating the cutter head with relation to the link, said means comprising a link pivoted at one end to the cutter head and connected at its other end to an eccentric rotatably mounted in the casing.

11. In a mining machine, a casing having thereon a pair of sleeves, bearing members in each sleeve, a shaft supported by the bearing members, a link pivotally supported at one end on the sleeves, and means operatively connected to the shaft for swinging the link about the sleeves.

12. In a mining machine, a casing having thereon a pair of sleeves, bearing members in each sleeve, a shaft supported by the bearing members, a link pivotally supported at one end on the sleeves, and means operatively connected to the shaft for swinging the link about the sleeves, said means including a gear on the shaft, a second shaft having a pair of rotatably mounted gears thereon, a clutch mechanism on said second shaft to cause one or the other of said pair of gears to rotate the second shaft, and a connection between each gear of the pair of gears and the gear on the first-named shaft.

13. In a mining machine, a casing having a shaft rotatably mounted thereon, a link pivoted at one end to the casing, a cutter head pivoted to the other end of the link, a cutter pivoted on the head, means extending through the link from the shaft for operating the cutter, a second link attached at one end to the cutter head, means connecting the other end of the second link to the shaft and forming a support for the shaft to move the second link longitudinally to move the cutter head on its pivot, and means extending from the shaft through the second link to move the cutter on its pivot.

14. In a mining machine, a support having a shaft rotatably mounted thereon, a link pivoted at one end to the support, the other end of said link having thereon a pair of arms, a sleeve in each arm, a shaft rotatably mounted in the sleeves and operatively connected to the first-named shaft, a cutter head having arms pivotally mounted on the sleeves, a cutter pivoted on the head and operatively connected to the second-named shaft, means connecting the first-named shaft to the cutter head, arms to move the cutter head about the sleeves, and means extending from the first-named shaft through the connecting means to swing the cutter head on its pivot.

15. In a mining machine, a cutter head having a pair of arms thereon, a pair of alined sleeves in the arms, a link pivoted at one end on the sleeves, a second pair of alined sleeves in the arms, a second link pivoted at one end to the second pair of sleeves, a cutter pivoted to the cutter head, a shaft mounted in the first-named pair of sleeves and operatively connected to the cutter, a second shaft mounted in the second-named sleeves and connected to the cutter to move it on its pivot, and means to pivotally support the other ends of the links.

16. In a mining machine, a cutter head having a pair of arms thereon, a pair of alined sleeves in the arms, a link pivoted at one end on the sleeves, a second pair of alined sleeves in the arms, a second link pivoted at one end to the second pair of sleeves, a cutter pivoted to the cutter head, a shaft mounted in the first-named sleeves and operatively connected to the cutter, a second shaft mounted in the second-named pair of sleeves, and connected to the cutter to move it on its pivot, means to pivotally support the other end of the first-named link, and means to adjustably support the other end of the second-named link.

17. In a mining machine, a cutter head having thereon a pair of arms and a pair of annular projections, bearing members in each projection, a shaft rotatably supported in the bearings, a cutter bar pivotally mounted at one end on the projections, a cutter member on said cutter bar operatively connected to the shaft, a link pivoted at one end to the arms and having therein means to rotate the shaft, a second link pivoted at one end to the arms, a support to which the other end of the first-named link is pivoted, means to adjustably connect the other end of the second link to the support, and means to rotate the cutter bar, said means including a worm supported by said first-named means.

18. In a mining machine, a cutter head having thereon a pair of arms and a pair of annular projections, a shaft rotatably mounted in the projections, a cutter bar pivoted at one end on the projections, a cutter member on said cutter bar operatively connected to the shaft, a link pivoted at one end to the arms, a support pivoted to the other end of the link, a shaft rotatably mounted on the support and operatively connected to the first-named shaft, an eccentric mounted on the support, a second link pivoted at one end to the arms and connected at its other end to the eccentric, and means on the second link operatively connected to the second-named shaft to rotate the eccentric to move the second link longitudinally.

19. In a mining machine, a casing having thereon a pair of sleeves, bearing members in each sleeve, a shaft rotatably supported by the bearing members, a link pivoted at one end on the sleeves, a cutter mechanism pivotally mounted on the other end of the link and operatively connected to the shaft, a second link pivoted at one end to the cutter mechanism, and means connecting the other end of the second link to the shaft to move the second link longitudinally to move the cutting mechanism on its pivot.

20. In a mining machine, a casing having thereon a pair of sleeves, bearing members in each sleeve, a shaft rotatably supported by the bearing members, a link pivoted at one end on the sleeves, a cutter mechanism pivotally mounted on the other end of the link and operatively connected to the shaft, a second link pivoted at one end to the cutter mechanism, and means connecting the other end of the second link to the shaft to move the second link longitudinally to move the cutting mechanism on its pivot, said means comprising an eccentric engaging the second link.

21. In a mining machine, a supporting head, a link pivoted at one end to said head, a cutter head pivoted to the other end of the link, a cutter bar pivoted to the cutter head, a second link pivoted at one end to the cutter head, a shaft having a fixed eccentric thereon engaging the other end of the second link for moving it longitudinally to rock the head on the first-named link, a sleeve rotatably mounted on the shaft, means to rotate the sleeve, a shaft operatively connected to said sleeve, a connection between said shafts, whereby on rotation of the sleeve the first-named shaft may be rotated in either direction, and a connection between the last-named shaft and the cutter bar, whereby on rotation of the sleeve the cutter bar may be swung about its pivot on the cutter head in two directions.

22. In a mining machine, a casing having a pair of arms, a sleeve in each arm, bearing members in each sleeve, a shaft mounted in the bearing members, a link having at one end arms pivotally mounted on the sleeves, a cutter head pivoted to the other end of the link, a cutter on the head operatively connected to the shaft, a second link longer than the first link pivoted at one end to the cutter head, and eccentrics connecting the other end of the second link to the arms.

23. In a mining machine, a casing having a pair of arms, a sleeve in each arm, bearing members in each sleeve, a shaft mounted in the bearing members, a link having at one end arms pivotally mounted on the sleeves, a cutter head pivoted to the other end of the link, a cutter on the head operatively connected to the shaft, a second link longer than the first link and out of parallelism therewith pivoted at one end to the cutter head, and eccentrics connecting the other end of the second link to the arms.

24. The combination in a mining machine, with a stationary support on the machine, and a rotatable adjustable head mounted on said support and forming part of a cutting unit, of a trapezium-shaped linkage comprising a main link having a pivotal support on the head, an auxiliary link having a pivotal support on the head and longitudinally movable with relation thereto, a cutter head having a pivotal support on each of said links, and means for moving the auxiliary link to adjust the cutter head.

25. In a cutting unit for a mining machine, the combination with a supporting head, of a trapezium-shaped linkage including a main link pivotally mounted on the head, a cutter head pivotally mounted at the front end of the main link, a longitudinally movable auxiliary link pivotally connected with the supporting head and also with the cutter head, and co-acting means mounted on the supporting head and the auxiliary link for moving the auxiliary link to adjust the cutter head.

26. In a cutting unit for a mining machine, the combination with a rotatable head, of a trapezium-shaped linkage including a main link having a pivot on said head, a cutter head having a pivotal support at the front end of the main link, a longitudinally movable auxiliary link having a pivotal support on the rotatable head and also a pivotal support for the cutter head, and means for moving the auxiliary link to adjust the cutter head.

27. The combination in a cutting unit for a mining machine, with a supporting head having a pivotal support thereon, of a trapezium-shaped linkage including a longitudinally movable auxiliary link having one end mounted on said support, coacting means on said support and link for moving the latter, and means for operating one of said moving-means with relation to the other.

FRANK B. YINGLING.